(12) United States Patent
Widmann

(10) Patent No.: US 7,512,516 B1
(45) Date of Patent: Mar. 31, 2009

(54) COLLISION AVOIDANCE AND WARNING SYSTEM AND METHOD

(75) Inventor: Glenn R Widmann, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/982,653

(22) Filed: Nov. 2, 2007

(51) Int. Cl.
  *G01C 9/00* (2006.01)
(52) U.S. Cl. .................................................... 702/151
(58) Field of Classification Search ................ 702/151; 701/301
  See application file for complete search history.

(56) References Cited

U.S. PATENT DOCUMENTS

| | | | |
|---|---|---|---|
| 4,926,171 A | * | 5/1990 | Kelley .................... 340/961 |
| 6,615,138 B1 | | 9/2003 | Schiffmann et al. |
| 7,016,782 B2 | | 3/2006 | Schiffmann |
| 2005/0197770 A1 | | 9/2005 | Schiffmann et al. |

\* cited by examiner

*Primary Examiner*—Bryan Bui
*Assistant Examiner*—Stephen J Cherry
(74) *Attorney, Agent, or Firm*—Jimmy L. Funke

(57) ABSTRACT

A collision avoidance and warning system and method are provided. The system includes a sensor and a controller. The sensor senses an object in a field of view, wherein the sensor determines a direct range measurement between the sensor and the object and an angle measurement of the object with respect to the sensor. The controller receives the direct range measurement and angle measurement from the sensor, and determines if the object is in an in-path area based upon the direct range measurement and angle measurement, as a function in a pseudo polar coordinate frame.

17 Claims, 4 Drawing Sheets

COLLISION AVOIDANCE AND WARNING SYSTEM AND METHOD

TECHNICAL FIELD

The present invention generally relates to a system and method for collision avoidance, and more particularly, to a system and method for collision avoidance and detection of objects.

BACKGROUND OF THE INVENTION

Generally, vehicles can be equipped with collision avoidance and warning systems for predicting potential collisions with external objects, such as another vehicle, a pedestrian, or a stationary object. These systems typically include driver interface and initiate countermeasures (e.g., enunciate driver alerts, enact vehicle dynamic actions, and deploy occupant protection/restraint devices) in order to anticipate crash scenarios and eliminate or mitigate the impact of those crashes. An example of a system where predicting a collision is desirable is an adaptive cruise control systems that generally tracks multiple leading vehicles and automatically controls both the speed and distance of the host vehicle.

Some vehicle avoidance systems generally require one or more object detection sensors for tracking one or more targets within a field of view. Some such target tracking systems can require yaw rate sensors for tracking a motion path of the host vehicle, and relatively complex and expensive detection sensors to acquire the range, range rate, azimuth angle to the detected objects. Other vehicle avoidance systems generally have object detection sensors that monitor markers on the roadway. Object detection sensors for requiring such data can be costly and require intensive calculations, analysis, and/or processing when analyzing the data, which adversely affects the processing or reaction time of the vehicle target tracking system or require the roadway to have markers.

Other collision avoidance systems view targets in the field of view by determining the crossing location or a miss distance. One such approach is disclosed in U.S. Pat. No. 6,615,138, entitled "COLLISION DETECTION SYSTEM AND METHOD OF ESTIMATING MISS DISTANCE EMPLOYING CURVE FITTING," the entire disclosure of which is hereby incorporated herein by reference. Another approach is disclosed in U.S. Pat. No. 7,016,782, entitled "COLLISION DETECTION SYSTEM AND METHOD OF ESTIMATING MISS DISTANCE," the entire disclosure of which is hereby incorporated herein by reference. Another approach is disclosed in U.S. Patent Application Publication No. 2005/0197770, entitled "COLLISION DETECTION SYSTEM AND METHOD OF ESTIMATING TARGET CROSSING LOCATION," the entire disclosure of which is hereby incorporated herein by reference. While the aforementioned approaches use at least one sensor to determine an object in a field of view, the above systems can create a situation where, due to the data being collected and the analysis, calculations, and/or processing of the data, the processing or reaction time of the system is longer than desired. Further, in some situations, the above approaches can create false identifications or false alarms where an object is within the field of view, and the system identifies this object as being in the in-path area, which enables a collision warning and/or an avoidance countermeasure, but the vehicle would not contact the object due to the vehicle's range of motion.

SUMMARY OF THE INVENTION

According to one aspect of the present invention, a collision avoidance and warning system includes a sensor for sensing an object in a field of view and a controller. The sensor determines a direct range measurement between the sensor and the object and an angle measurement of the object with respect to the sensor. The controller receives the direct range and angle measurements from the sensor. The controller determines if the object is in an in-path area based upon the direct range and angle measurements, as a function in a pseudo polar coordinate frame.

According to another aspect of the present invention, a collision avoidance and warning system includes a sensor for sensing an object in a field of view and a controller. The sensor is not a yaw rate sensor and determines a direct range measurement between the sensor and the object and an angle measurement of the object with respect to the sensor. The controller receives the direct range and angle measurements from the sensor. The controller processes the direct range and angle measurements as a function in a pseudo polar coordinate frame, and determines if the object is in an in-path area.

In accordance with yet another aspect of the present invention, a method for determining if an object is in an in-path area includes the steps of sensing an object in a field of view by a sensor, determining a direct range measurement between the sensor and the object, and determining an angle measurement of the object with respect to the sensor. The method further includes the steps of receiving the direct range and angle measurements by the controller from the sensor, processing the direct range and angle measurements as a function in a pseudo polar coordinate frame, and determining if the object is in the in-path area.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
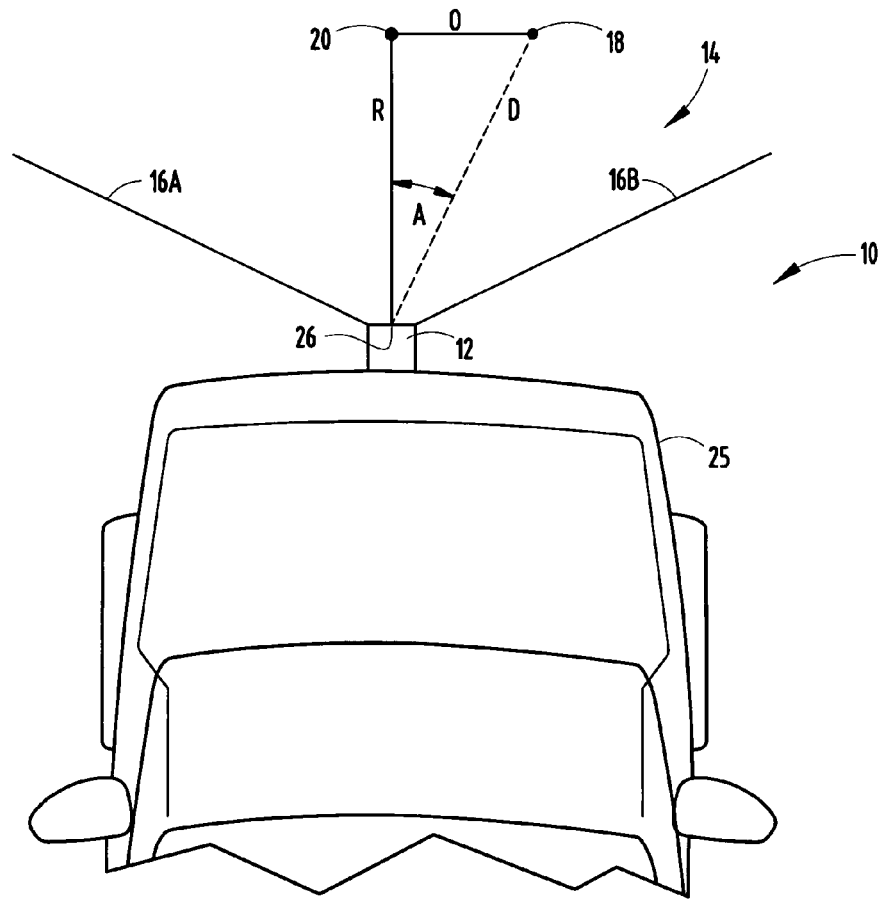
FIG. 1 is a plan view illustrating the geometry of a collision avoidance system utilizing a sensor on a vehicle in accordance with an embodiment of the present invention.

In reference to FIG. 1, a vehicle having a collision avoidance system is generally shown at reference identifier 10 and includes a sensor 12. A field of view, generally indicated at reference identifier 14, of sensor 12 is defined by boundaries 16A and 16B. Thus, the sensor 12 monitors and determines if any objects 18 are within the field of view 14. The sensor 12 determines a direct range measurement D, which is the direct distance between the sensor 12 and object 18. A longitudinal range measurement R correlates to a y-coordinate on a Cartesian coordinate frame, and represents a perpendicular range location 20 of the object 18, such as a boresight perpendicular range location. An offset range measurement O correlates to the x-coordinate on a Cartesian coordinate frame, and represents the offset range of object 18 from location 20. The sensor 12 also determines an angle measurement A, which is the angle between the perpendicular location 20 and object 18. Thus, R and O represent two legs of a right triangle, which is related to the hypotenuse or D measurement that is the direct distance or range between the sensor 12 and the object 18.

Figure 2:
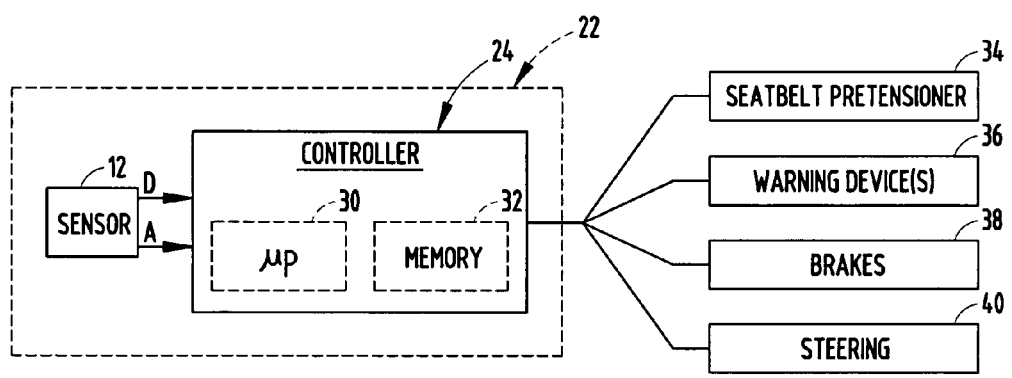
FIG. 2 is a schematic diagram of the collision avoidance system in accordance with an embodiment of the present invention.

Referring to both FIGS. 1 and 2, a collision avoidance system is generally indicated at reference identifier 22. The collision avoidance system 22 includes the sensor 12 and a controller generally indicated at reference identifier 24. The controller 24 receives the direct range measurement D and angle measurement A from the sensor 12. The controller 24 then determines if the object 18 is in an in-path area by processing the direct range measurement D and angle measurement A.

Typically, the in-path area is a predetermined area surrounding the sensor 12, as described in greater detail below.

The controller 24 processes the direct range measurement D and angle measurement A as a function in a pseudo polar coordinate frame. As shown in FIGS. 1-2 and 6-8, the controller 24 processes the direct range measurement D and angle measurement A in the pseudo polar coordinate frame, and determines if the object 18 is in the in-path area. Typically, the object 18 is in the in-path area and will contact a vehicle 25 if the object 18 passes through an origin 26 of the pseudo polar coordinate frame. This is a result of processing the direct range D and angle A in the pseudo polar coordinate frame, since data in the pseudo polar coordinate frame is expressed in a format of a distance and sin (angle) from the origin 26 at an angle from a vertical axis 20.

Figure 4:
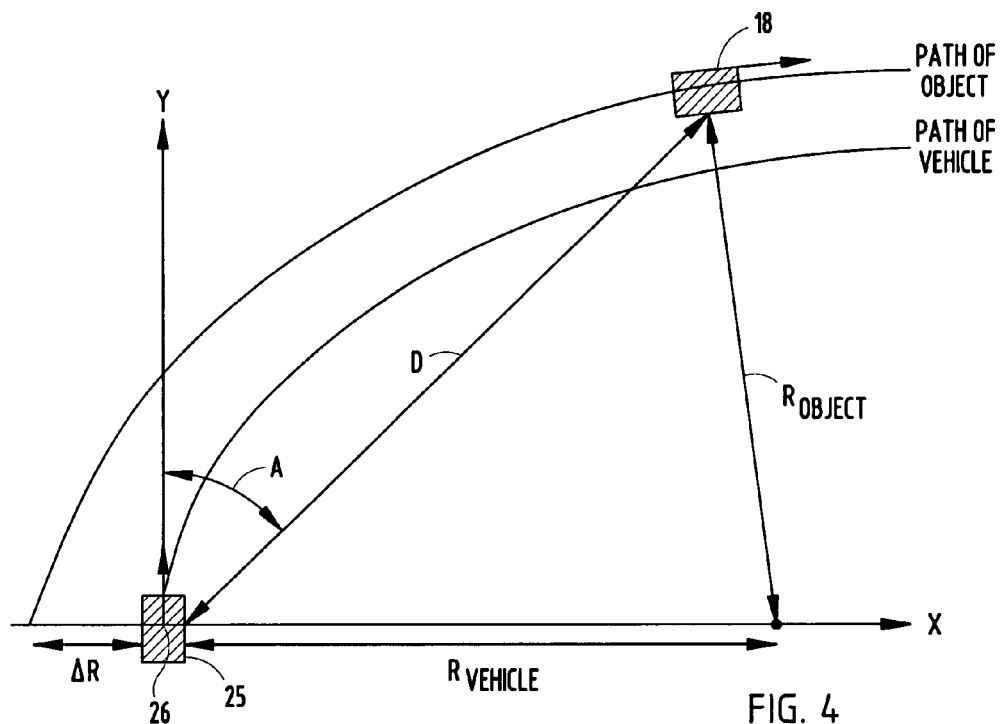
FIG. 4 is a graph illustrating a geometric roadway relationship between a vehicle and an object in a Cartesian coordinate frame.

In reference to FIG. 1, the respective motion of the vehicle 25 and the object 18 can be represented in a Cartesian coordinate frame (FIG. 4). The path motion of the vehicle 25 is represented by a radius of curvature ($R_{vehicle}$). The path motion of the object 18 is represented by a radius of curvature ($R_{object}$). The path motion difference between the path motion of the vehicle 25 and the object 18 is represented by $\Delta R$.

Figure 5:
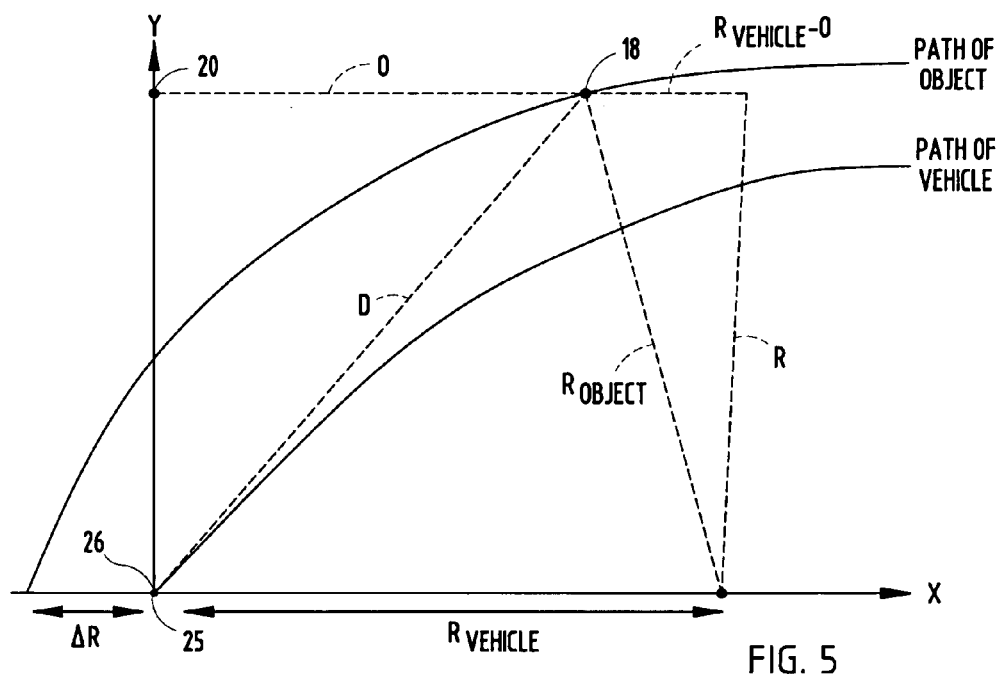
FIG. 5 is a graph illustrating sensed data as a function in a Cartesian coordinate frame.

In reference to FIGS. 1 and 4-5, in a Cartesian coordinate frame the vehicle 25 and object 18 have a non-linear relationship, as the vehicle 25 moves with respect to the object 18. This generally results in a very complex analysis for determining if object 18 is in the in-path area of vehicle 25 and will result in a possible collision between vehicle 25 and object 18. If this complex analysis is not computed properly, it can further result in false identifications of objects 18 that are determined to be in the in-path area but are actually not located in the in-path area, or conversely no identification of objects 18 to be determined to be in the in-path area, but are actually located in the in-path area. This is undesirable because results having a portion of the results being false identifications results in false alarm collision avoidance countermeasure actions, and no identifications results in collisions with no collision avoidance countermeasures, and the system is considered unusable, and a complex analysis can result in a slow or sluggish system that would not notify the occupants of the vehicle in an adequate amount of time that the vehicle will collide with an object.

Figure 6:
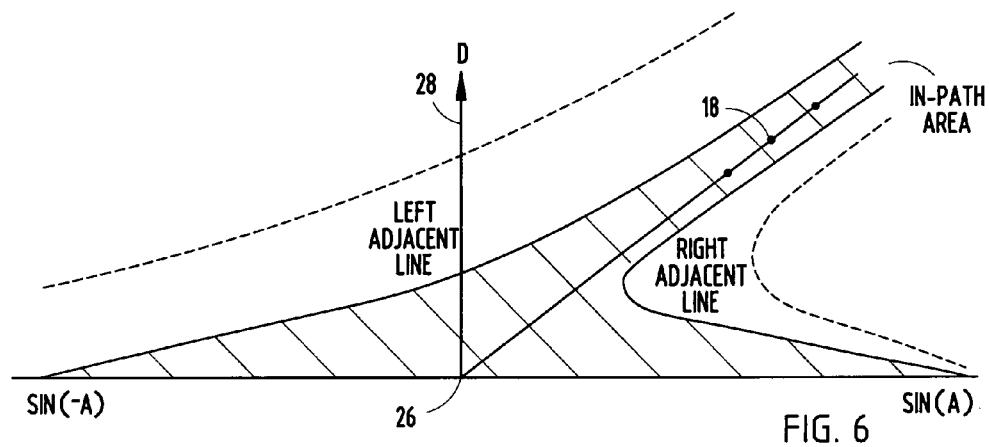
FIG. 6 is a graph illustrating sensed data in a pseudo polar coordinate frame where a roadway is curved clockwise or right with respect to a vehicle in accordance with an embodiment of the present invention.
Figure 7:
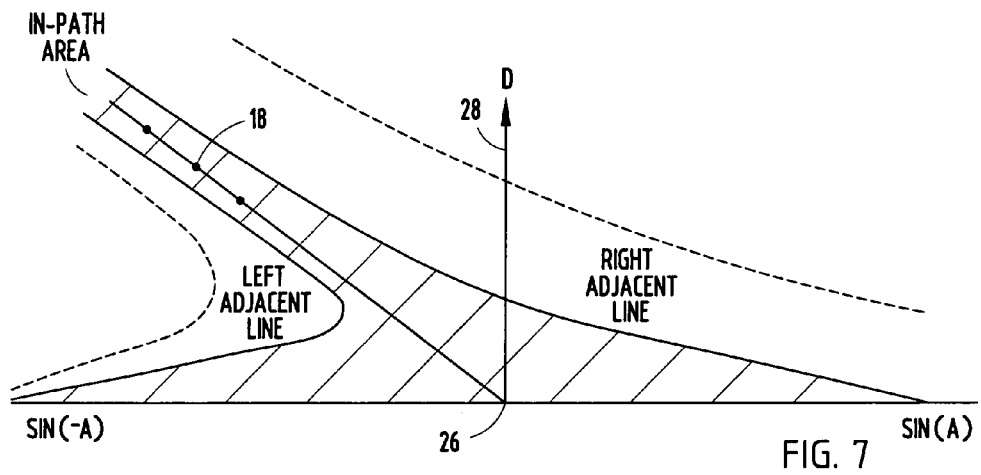
FIG. 7 is a graph illustrating sensed data in a pseudo polar coordinate frame where a roadway is curved counter-clockwise or left with respect to a vehicle in accordance with an embodiment of the present invention.
Figure 8:
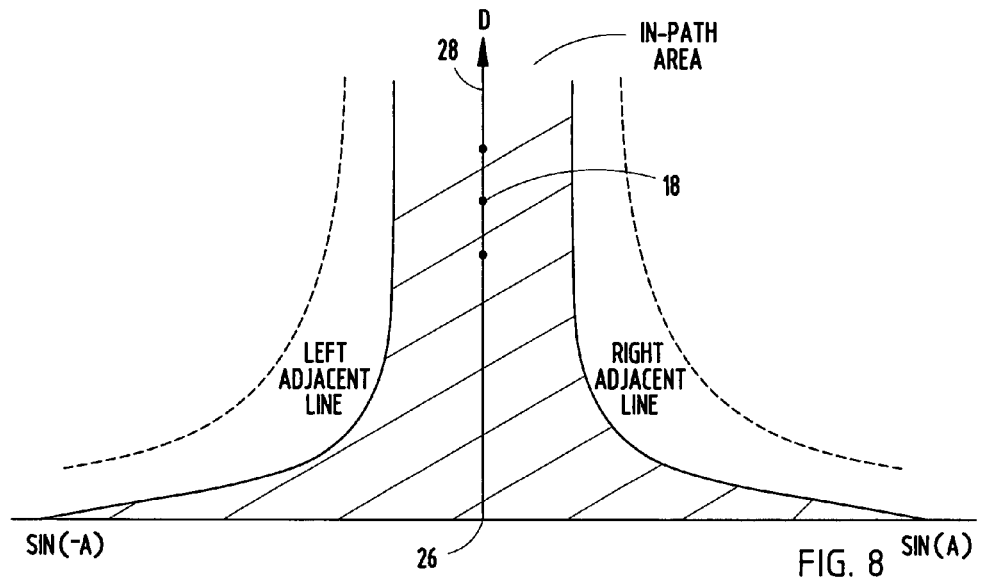
FIG. 8 is a graph illustrating sensed data in a pseudo polar coordinate frame where a roadway is straight with respect to a vehicle in accordance with an embodiment of the present invention.

The sensed data, the direct range measurement D and angle measurement A, can be plotted as a function in a Cartesian coordinate frame (FIGS. 4 and 5) and in a pseudo polar coordinate frame (FIGS. 6-8). By processing the sensed data as a function in a pseudo polar coordinate frame (FIGS. 6-8), the non-linear path of the vehicle 25 and object 18 in the Cartesian coordinate frame (FIGS. 4 and 5) is linear which results in a less complex analysis. The sensed data in the Cartesian coordinate frame is corresponding to the data in the pseudo polar coordinate frame, which is shown below.

In reference to FIGS. 1, 4, and 5, based upon the relationship of the vehicle 25 and object 18 from an origin of the Cartesian coordinate frame, the direct range measurement D from sensor 12 to object 18 is the hypotenuse of a right triangle with the two legs of the triangle that are equal to the longitudinal range measurement R and offset range measurement O. This relationship is represented in the following equation:

$$R^2 + O^2 = D^2$$

The motion path of the object 18, as described by, the radius of curvature ($R_{object}$), is the hypotenuse of a right triangle with the two legs of the triangle that are equal to the range measurement R and the radius of curvature ($R_{vehicle}$) minus the offset range measurement O ($R_{vehicle}-O$), to form the equation:

$$(R_{vehicle}-O)^2 + R^2 = R_{object}^2$$

Expansion of the above two equations yields:

$$R_{object}^2 = R_{vehicle}^2 - 2OR_{vehicle} + D^2$$

Solving for the offset range measurement O:

$$O = \frac{D^2 - 2\Delta R\ R_{vehicle} - \Delta R^2}{2R_{vehicle}}$$

Since O=D sin A:

$$D^2 - (2R_{vehicle} \sin A)D - (2\Delta R R_{vehicle} + \Delta R^2) = 0$$

Solving for D using the quadratic formula, simplifies to:

$$D = R_{vehicle} \sin A \pm \sqrt{(R_{vehicle}\sin A)^2 + (2\Delta R R_{vehicle} + \Delta R^2)}$$

This above equation is a non-linear relationship describing the path motion of vehicle 25 ($R_{vehicle}$) with respect to the object 18 in the Cartesian coordinate frame. In order to monitor and detect objects to determine if the vehicle will contact the detected object using this non-linear relationship in the Cartesian coordinate frame, a yaw rate sensor is typically required to provide yaw rate measurements in order to estimate the path motion of the vehicle 25 ($R_{vehicle}$). This results in a very complex non-linear multi-dimensional analysis for determining if the vehicle 25 will collide with an object 18. Additionally, a yaw rate signal is generally required to have a significant amount of signal processing and filtering procedures in order to minimize noise, which can result in delayed or slow processing and false identification of objects to be in the in-path area.

When ΔR=0 (when the vehicle 25 and the object 18 are in the same path), the above non-linear relationship simplifies to:

$$D=2R_{vehicle} \sin A$$

The final above equation is represented by a straight line in a pseudo polar coordinate frame formed by direct range measurement D and pseudo angle sin A, with a slope of 2 $R_{vehicle}$. Thus, a yaw rate sensor is not required, since this relationship between the vehicle 25 and object 18 is not dependant on a yaw rate measurement. The yaw rate measurement is not needed because it is not required to calculate the radius of curvature ($R_{vehicle}$), but rather $R_{vehicle}$ is observed as a linear slope to be inferred by successive measurements from sensor 12 of direct range measurement D and angle A to form pseudo angle sin A. When the vehicle 25 is at the origin 26 the object 18 is shown at a distance and angle with respect to the vehicle 25. The path of the object 18 is always linear with respect to the vehicle 25, and the object 18 collides with the vehicle 25 when the object 18 passes through the origin 26 of the pseudo polar coordinate frame.

Referring to FIGS. 6-8, by analyzing the sensed data in a pseudo polar coordinate frame, the object 18 can be accurately identified as being in the in-path area even when the vehicle 25 and object 18 are on a clockwise curve roadway (FIG. 6) or a counter-clockwise curved roadway (FIG. 7), in addition to when the vehicle 25 and object 18 are on a straight roadway (FIG. 8). When the vehicle 25 and object 18 is either on the curved roadway (FIGS. 6-7) or a straight roadway (FIG. 8), and when vehicle 25 approaches the object 18 that is in the in-path area, then successive measurements from sensor 12 of the direct range measurement D and angle A to form pseudo angle sin A, which is processed to form a straight line of slope $2R_{vehicle}$ with an intersection into origin 26 in the pseudo polar coordinate frame. Similarly, if a straight line is not processed, then object 18 is not within the in-path area.

The controller 24 includes a microprocessor 30 and memory 32 with which to process the data received from the sensor 12 and store such data and other calculations. It should be appreciated that the controller 24 can be programmed to include an in-path area that is a predetermined area surrounding the sensor 12, such as but not limited to the width of the vehicle, the width of the vehicle plus a tolerance, or the like. Thus, the in-path area is a predetermined area where it is determined that the object 18 will contact the vehicle 25 or pass within the predetermined tolerance area with respect to the vehicle 25.

Typically, the sensor 12 monitors the field of view 14 in predetermined time increments to determine if the direct range measurement D and angle measurement A have been altered. By way of explanation and not limitation, the sensor 12 can monitor the filed of view 14 every 100 microseconds (μs) to determine if the object 18 has moved with respect to the vehicle 25 and sensor 12. Typically, the sensor 12 is mounted on the front of the vehicle 25, such as but not limited to, a front bumper assembly or the like. By placing the sensor 12 on the front of the vehicle 25, the sensor 12 can view the area in front of the vehicle 25 without any obstructions from the vehicle 25.

By way of explanation and not limitation, the sensor 12 is a radar sensor, a lidar sensor, a video imaging device, or the like. It should be appreciated by those skilled in the art that the sensor 12 can be any device that is capable of determining the direct range measurement D and the angle measurement A. Further, the controller 24 does not require a yaw rate sensor measurement from either an internal vehicle yaw rate sensor or from a yaw rate sensor that could be integrated in object sensor 12 to predict the motion path of the host vehicle. By not using a yaw rate sensor, the system 22 functions at a quicker processing rate, which results in greater accuracy and efficiency than a system that includes a yaw rate sensor. Typically, yaw rate sensors are expensive and they are required to have a significant amount of signal processing in order to minimize noisy signal signatures naturally associated with the yaw rate sensor. This ultimately results in the yaw rate signal being delayed and sluggish and affects the processing response of the system 22. The sluggish response time can result in late indications or incorrect indications to the vehicle occupants of an object 18 in the in-path area.

According to a disclosed embodiment, the controller 24 can activate one or more predetermined features of the vehicle 25 in response to the controller 24 determining that there is an object 18 in the in-path area. Such vehicle features are, but not limited to, a seatbelt pretensioner 34, warning devices 36, automatically applying the brakes 38, automatically altering the steering 40 of the vehicle 25, or the like. Thus, when the controller 24 determines that an object 18 is in the in-path area, the controller 24 can warn the driver or control the vehicle 25 to take evasive actions to prevent the object 18 from colliding with the vehicle 25. It should be appreciated by those skilled in the art that any vehicle, feature, component, function, or device can be associated with the system 22, where it is beneficial to have advanced warning of an object 18 colliding with the vehicle 25.

Figure 3:
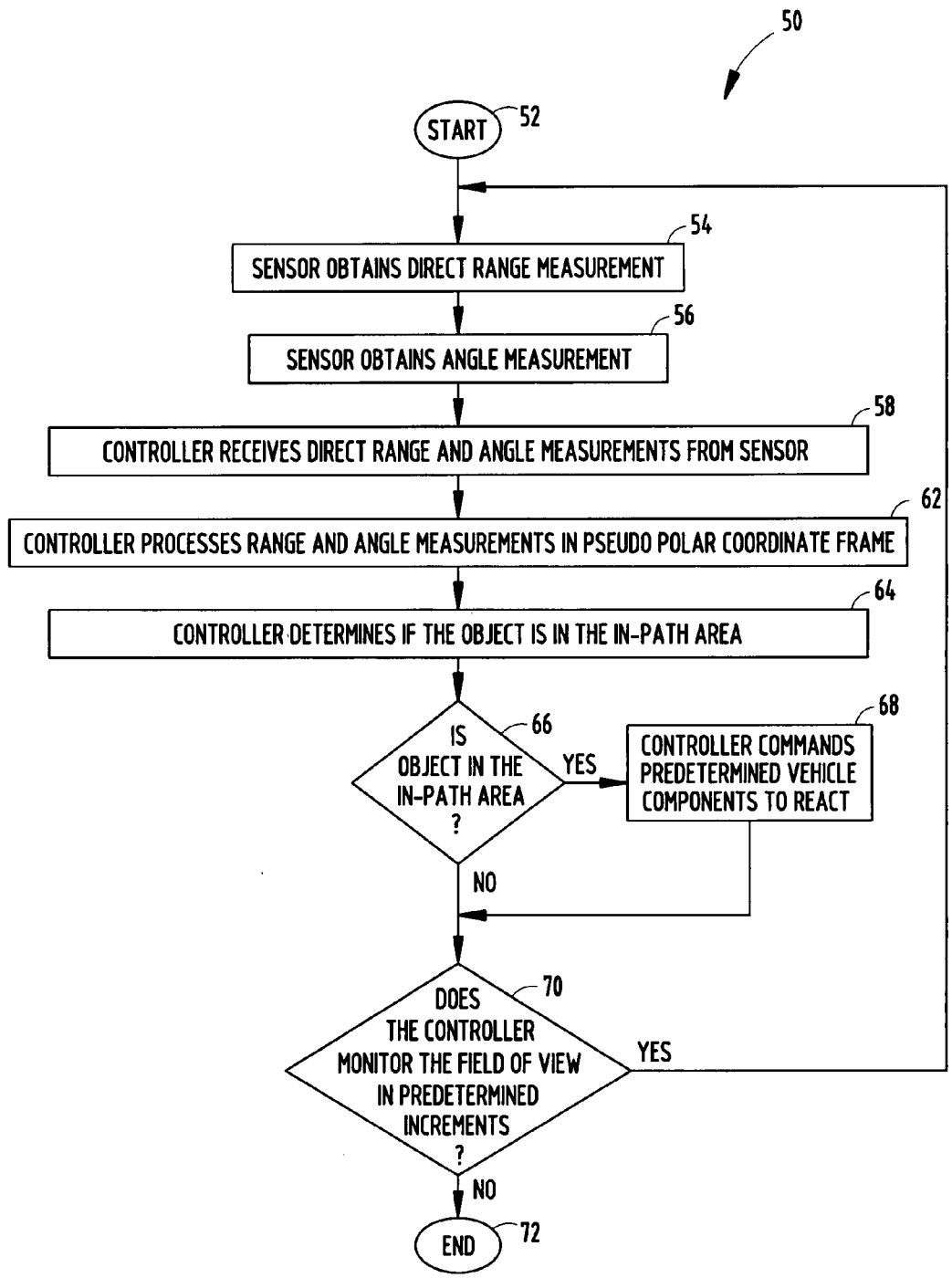
FIG. 3 is a flow chart illustrating a method for determining if an object is in an in-path area in accordance with an embodiment of the present invention.

In reference to FIGS. 1-3, a method for determining if an object is in an in-path area is generally shown at 50. The method 50 begins at step 52 and proceeds to step 54, where the sensor 12 obtains the direct range measurement D. Next, at step 56, the sensor 12 obtains the angle measurement A. The method 50 then proceeds to step 58, where the controller 24 receives the direct range measurement D and angle measurement A from the sensor 12.

After that, at step 62, the controller 24 processes the direct range measurement D and angle measurement A as a function in a pseudo polar coordinate frame. Then, the controller 24 determines if the object 18 is in the in-path area at step 64. At decision step 66, if the object 18 is in the in-path area, then the method 50 proceeds to step 68, where the controller 24 commands predetermined vehicle features or components to react.

By way of explanation and not limitation, such predetermined vehicle 25 features or components are a seatbelt pretensioner 24, a warning device 36, brakes 38, steering 40, and the like. Typically, the ability to accurately predict an upcoming collision also enables a controller 24 to control and deploy safety-related devices on the vehicle 25. For example, upon predicting an anticipated collision or near collision with an object 18, the controller 24 could initiate a driver alert enunciation to notify the driver of a potential collision and allow the driver to avert the event. The controller 24 could also activate a vehicle 25 seatbelt pretensioner in a timely manner to pretension the seatbelt, or the airbag system could be readied for quicker activation, thereby enhancing application of the safety devices.

If it is determined that the object 18 is not in the in-path area at decision step 66, the method 50 proceeds to decision step 70. Likewise, after the controller 24 commands predetermined vehicle features or components to react at step 68, the method 50 proceeds to decision step 70. At decision step 70, if the controller 24 monitors the field of view in predetermined time increments, the method 50 then returns to step 54 to obtain and process the data, otherwise, the method 50 ends at step 72.

Advantageously, the vehicle 25 having the collision avoidance system 22 and method 50 allows for a single sensor 12 to accurately monitor a field of view and determine if objects 18 are in an in-path area. Further, since a yaw rate sensor is not used to predict the path of motion of the host vehicle, the system 10 can generally function at a quicker rate, while maintaining accuracy as to the objects 18 that are being detected. Also, while only requiring a single sensor, the system 10 is economical compared to other systems that require a yaw rate sensor or multiple sensors. Additionally, the system 22 does not require the roadway to have markers for the sensor 12 to monitor.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A collision avoidance and warning system comprising:
   a sensor for sensing an object in a field of view, wherein said sensor determines a direct range measurement between said sensor and said object and an angle measurement of said object with respect to said sensor; and
   a controller that receives said direct range measurement and said angle measurement from said sensor, wherein said controller determines if said object is in an in-path area based upon said direct range and said angle measurement, as a function in a pseudo polar coordinate frame, wherein said controller determines said object is in said in-path area based upon said direct range measurement and said angle measurement if said object passes through an origin of said pseudo polar coordinate frame.

2. The system of claim 1 further comprising at least one predetermined vehicle feature that is activated by said controller when said object is in said in-path area.

3. The system of claim 1, wherein said in path area is a predetermined area surrounding said sensor.

4. The system of claim 1, wherein said sensor monitors said field of view in predetermined time increments to determine if said direct range measurement and said angle measurement have been altered.

5. The system of claim 1 further comprising said sensor being mounted on a front of a vehicle.

6. The system of claim 1, wherein said sensor is not a yaw rate sensor.

7. The system of claim 1, wherein said sensor is one selected from a group consisting of:
   a radar sensor;
   a lidar sensor; and
   a video imaging device.

8. A collision avoidance and warning system comprising:
   a sensor for sensing an object in a field of view, wherein said sensor is not a yaw rate sensor and said sensor determines a direct range measurement between said sensor and said object and an angle measurement of said object with respect to said sensor; and
   a controller that receives said direct range measurement and said angle measurement from said sensor, wherein said controller processes said direct range and said angle measurement as a function in a pseudo polar coordinate frame and determines if said object is in an in-path area, wherein said controller determines said object is in said in-path area based upon said direct range and said angle measurement if said object passes through an origin of said polar coordinate frame.

9. The system of claim 8, wherein said in-path area is a predetermined area surrounding said sensor.

10. The system of claim 8, wherein said sensor monitors said field of view in predetermined time increments to determine if said direct range and said angle measurement have been altered.

11. The system of claim 8 further comprising said sensor being mounted on a front of a vehicle.

12. The system of claim 8, wherein said sensor is one selected from a group consisting of:
    a radar sensor;
    a lidar sensor; and
    a video imaging device.

13. A method for determining if an object is in an in-path area, said method comprising the steps of:
    sensing an object in a field of view by a sensor;
    determining a direct range measurement between said sensor and said object;
    determining an angle measurement of said object with respect to said sensor;
    providing a controller that receives said direct range measurement and said angle measurement from said sensor;
    processing said direct range measurement and said angle measurement as a function in a pseudo polar coordinate frame; and
    determining if said object is in said in-path area based upon said direct range measurement and said angle measurement if said object passes through an origin of said pseudo polar coordinate frame.

14. The method of claim 13 further comprising the step of said controller monitoring said field of view in predetermined time increments to determine if said direct range measurement and said angle measurement have been altered.

15. The method of claim 13 further comprising the step of providing a vehicle, wherein said sensor is mounted on a front of said vehicle.

16. The method of claim 13, wherein said sensor is not a yaw rate sensor.

17. The method of claim 13, wherein said sensor is one selected from a group consisting of:
    a radar sensor;
    a lidar sensor; and
    a video imaging device.

* * * * *